US012756456B2

(12) United States Patent
Chen et al.

(10) Patent No.: US 12,756,456 B2
(45) Date of Patent: Oct. 6, 2026

(54) CONTROL METHOD AND CONTROL DEVICE FOR LINK SWITCHING

(71) Applicant: Robert Bosch GmbH, Stuttgart (DE)

(72) Inventors: Guotao Chen, Suzhou (CN); Baohong Cheng, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 580 days.

(21) Appl. No.: 17/999,812

(22) PCT Filed: May 27, 2021

(86) PCT No.: PCT/EP2021/064217
§ 371 (c)(1),
(2) Date: Nov. 23, 2022

(87) PCT Pub. No.: WO2021/239881
PCT Pub. Date: Dec. 2, 2021

(65) Prior Publication Data
US 2023/0170986 A1 Jun. 1, 2023

(30) Foreign Application Priority Data
May 29, 2020 (CN) ......................... 202010475755.2

(51) Int. Cl.
*H04B 7/185* (2006.01)
*H04B 17/309* (2015.01)
*H04B 17/382* (2015.01)

(52) U.S. Cl.
CPC ..... *H04B 7/18519* (2013.01); *H04B 7/18513* (2013.01); *H04B 17/309* (2015.01); *H04B 17/382* (2015.01)

(58) Field of Classification Search
CPC .......... H04B 7/185–195; H04B 17/309; H04B 17/382; H04B 7/18513; H04B 7/18519
See application file for complete search history.

(56) References Cited

U.S. PATENT DOCUMENTS

2003/0129943 A1 7/2003 Park et al.
2016/0295386 A1* 10/2016 Faccin .................. H04W 4/029
2017/0285176 A1* 10/2017 Croyle .................... G01S 19/42
(Continued)

FOREIGN PATENT DOCUMENTS

JP 2009-27227 A 2/2009
WO 2010/025022 A1 3/2010
WO 2018/085424 A1 5/2018

OTHER PUBLICATIONS

International Search Report corresponding to PCT Application No. PCT/EP2021/064217, mailed Sep. 30, 2021 (English language document) (4 pages).

*Primary Examiner* — Raymond S Dean
(74) *Attorney, Agent, or Firm* — Maginot, Moore & Beck LLP

(57) ABSTRACT

A control method and control device for link switching is disclosed. The control method includes (i) receiving a current coded signal from a main data link, the current coded signal containing coded application data, (ii) decoding the current coded signal to determine signal quality, (iii) evaluating a historical coded signal transmitted via the main data link, and (iv) and determining, on the basis of the signal quality and an evaluation result of the historical coded signal, whether to switch to an auxiliary data link to receive the application data.

7 Claims, 4 Drawing Sheets

(56) References Cited

U.S. PATENT DOCUMENTS

| | | | | |
|---|---|---|---|---|
| 2018/0299561 | A1* | 10/2018 | Jau | G01S 19/235 |
| 2019/0380083 | A1 | 12/2019 | Stauffer et al. | |
| 2020/0008018 | A1* | 1/2020 | Moustafa | H04W 4/80 |
| 2020/0245210 | A1* | 7/2020 | Fotheringham | H04L 45/08 |
| 2020/0302801 | A1* | 9/2020 | Urbanek | H04B 7/18508 |
| 2021/0194571 | A1* | 6/2021 | Ma | H04B 7/18504 |

* cited by examiner

CONTROL METHOD AND CONTROL DEVICE FOR LINK SWITCHING

This application is a 35 U.S.C. § 371 National Stage Application of PCT/EP2021/064217, filed on May 27, 2021, which claims the benefit of priority to Serial No. CN 2020 1047 5755.2, filed on May 29, 2020 in China, the disclosures of which are incorporated herein by reference in their entirety.

The present invention relates to signal transmission, in particular to multi-link switching technology.

BACKGROUND

With the development of satellite positioning technology and the growth of demand for geographic positioning, global navigation satellite systems (GNSSs) have been deployed in more and more fields, such as ground transportation and navigation. FIG. 1 shows a schematic diagram for the positioning of a moving vehicle by satellites. As shown in FIG. 1, the vehicle receives satellite signals from positioning satellites $P_1$, $P_2$, and $P_3$ via the satellite-to-earth link Lp to determine its current geographic location; these satellite signals contain information about the locations of these positioning satellites, signal propagation time, etc., and are affected by, for example, the ionosphere and troposphere, during reception. Therefore, in order to improve the accuracy of GNSS positioning, a geostationary satellite, for example, Si shown in the figure, is used to broadcast correction data information; correction data indicates a satellite clock difference, a satellite orbit difference, parameters related to the ionosphere and troposphere, and other parameters. Thus, the vehicle further receives correction data broadcast by the geostationary satellite Si via the satellite-to-earth link Ls, and uses the received correction data to correct the satellite signals received from the positioning satellites $P_1$, $P_2$, and $P_3$, so that a position of the vehicle is calculated more accurately. However, due to the influence of the environment in which the vehicle runs, the communication link between the vehicle and the satellite Si may not be always strong, or may even be interrupted, which will greatly affect the effect of positioning of the vehicle.

SUMMARY

The present invention proposes a control method and control device for link switching, which can improve the effect of positioning of a vehicle.

According to one aspect of the present invention, a control method for link switching is provided, comprising: receiving a current coded signal from a main data link, wherein the current coded signal contains coded application data; decoding the current coded signal to determine signal quality; evaluating a historical coded signal transmitted via the main data link; and determining, on the basis of the signal quality and an evaluation result of the historical coded signal, whether to switch to an auxiliary data link to receive the application data.

Preferably, a method according to the present invention may further comprise: when the signal quality has not reached a predetermined standard, if the evaluation result has not reached a predetermined threshold, switching to the auxiliary data link to receive the application data; if the evaluation result has reached the predetermined threshold, maintaining the main data link and obtaining a coded signal of the next time; when the signal quality has reached the predetermined standard, applying the decoded application data.

According to another aspect of the present invention, a control device for link switching is provided, comprising: a receiver configured to receive a current coded signal from a main data link, wherein the current coded signal contains coded application data; a network interface configured to receive the application data by an auxiliary data link; and a controller configured to: decode the current coded signal to determine the current signal quality; evaluate a historical coded signal transmitted via the main data link; and on the basis of the signal quality and the evaluation result, determine whether to switch on the auxiliary data link through the network interface to receive the application data.

DETAILED DESCRIPTION

In conjunction with the drawings for the embodiments of the present invention, the technical solutions provided by the embodiments of the present invention will be clearly and completely described below. Obviously, the described embodiments are only intended to explain, instead of limiting, the present invention. In the following embodiments, a satellite positioning technology is used as an example to elaborate several implementations of the present invention, but it is understandable that the present invention is not limited to satellite positioning scenarios.

With the development of wireless communication technology, especially the popularization of 4G and 5G networks, and advancements in next-generation communication technologies, real-time communication with extremely low latency has become a reality, providing technical guarantee for the implementation of applications requiring extremely low latency, such as autonomous driving. The present invention precisely uses a wireless communication network as an auxiliary data link to counter the influence of poor satellite-to-earth link communication with a satellite, so that data required for accurate positioning, for example, correction data Correction Data from a geostationary satellite in this embodiment, may still be obtained in a timely manner.

Figure 1:
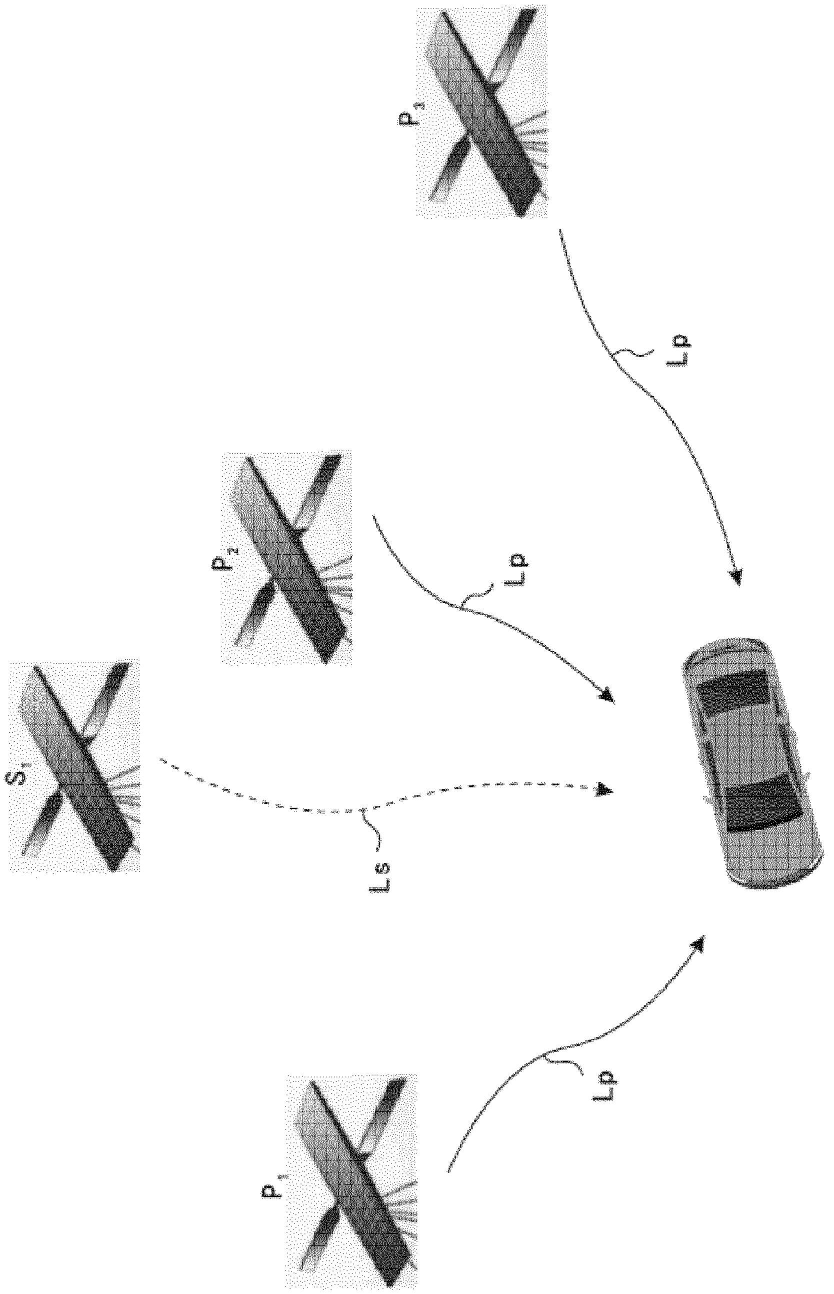
FIG. 1 shows a schematic diagram for a satellite positioning system in the prior art.
Figure 2:
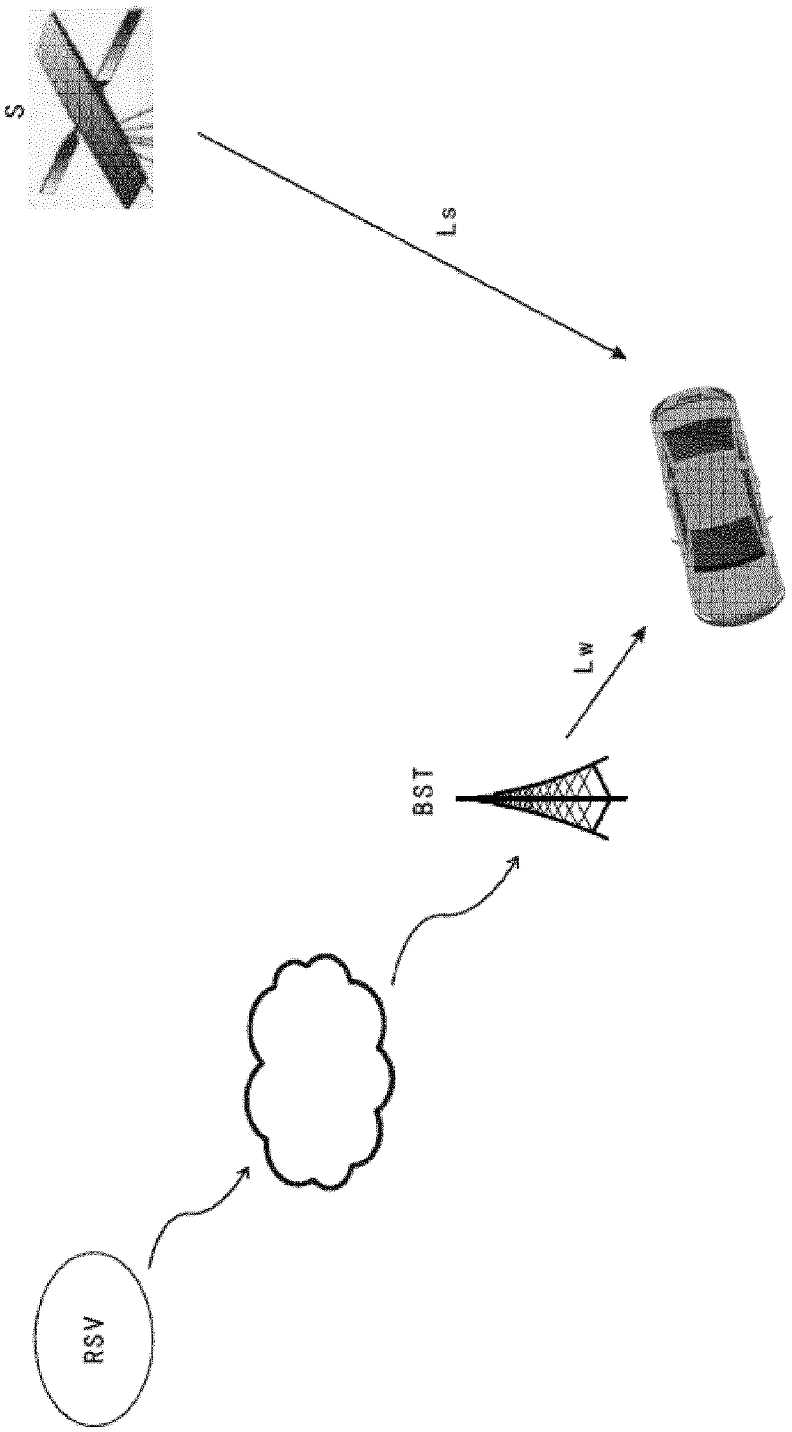
FIG. 2 shows a schematic diagram for the acquisition of satellite positioning correction data in an application scenario according to an embodiment of the present invention.

FIG. 2 shows a schematic diagram for an application scenario according to the present invention. As shown in the figure, the control device for positioning that is installed in the moving vehicle receives correction data from the satellite S via the satellite-to-earth link Ls, wherein the satellite-to-earth link Ls may be, for example, L-band broadcast. In addition, the control device may further be configured to communicate with a base station BST through a wireless communication network (for example, the Internet) link Lw; however, it should be noted that according to this embodiment, the wireless link between the control device and the base station BST is usually broken, and that a communication link is established only when needed, so as to avoid the occupancy of wireless resources. When the vehicle moves, due to the influence of geographical and environmental factors, the link quality of the satellite-to-earth link Ls may go down. Therefore, by evaluating satellite signals broadcast on the satellite-to-earth link Ls, the control device in the vehicle may switch to the wireless network link Lw, and receive correction data Correction_Data from a remote server RSV via the network through the base station BST. It should be pointed out that, usually, correction data broadcast by the geostationary satellite S comes from the uplink station, that is, the remote server RSV. Therefore, the correction data obtained by the vehicle from the remote server RSV through the wireless network and the correction data broadcast by the satellite S are the same data.

Figure 3:
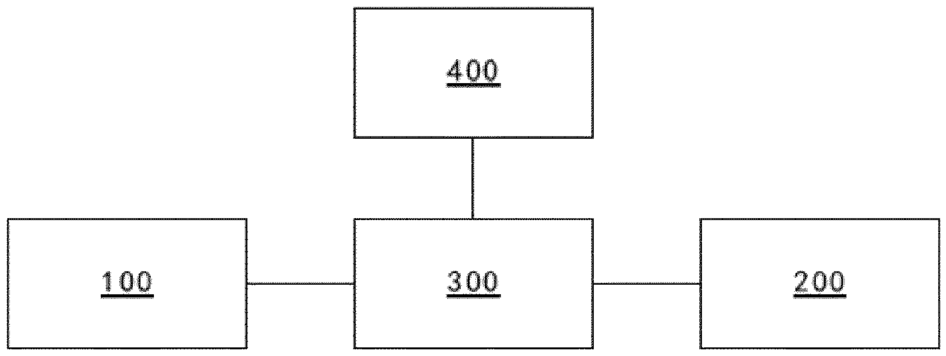
FIG. 3 shows a schematic diagram for a control device for link switching control according to an embodiment of the present invention.

FIG. 3 shows a schematic diagram for a control device for link switching control according to an embodiment of the present invention. In this embodiment, the control device may be installed as a positioning device on any target that needs to be positioned, for example, a vehicle. It should be pointed out that in order to highlight the concept and solution characteristics of the present invention, not all other components or constituent parts of the control device for completing its positioning services are shown, but those of ordinary skill in the art can think of other components or constituent parts needed.

As shown in FIG. 3, the control device comprises a receiver 100, a network interface 200, and a controller 300. The receiver 100 is configured to receive correction data Correction_Data broadcast by the satellite S via the satellite-to-earth link Ls. It is understandable that the correction data Correction_Data is usually broadcast via the satellite-to-earth link Ls in the form of a coded signal encrypted in advance; for ease of description, a broadcast signal from a satellite is hereinafter referred to as "SAT". The satellite may be one or more of the currently known GPS, Beidou, GLONASS, and Galileo positioning systems, and the satellite-to-earth link Ls can use the L-band or any other band known in the art. The network interface 200 may communicate with a remote server RSV via a base station BST through a currently known wireless communication protocol. The communication protocol may be, for example, the 4G or 5G wireless communication protocol, NB-IOT, or Long Range Wide-area network (LoRa) Internet of Things protocol.

According to this embodiment, the controller 300 uses the satellite-to-earth link Ls as the main data link, and receives a broadcast signal SAT from the satellite S through the receiver 100. The controller 300 decodes the broadcast signal SAT and attempts to restore the correction data Correction_Data. The controller 300 may determine signal quality Q of the broadcast signal SAT received from the satellite S by determining whether the correction data Correction_Data is successfully restored. As another common method, the controller 300 can also calculate a carrier-to-noise (C/N) ratio of the satellite-to-earth link Ls on the basis of the received broadcast signal SAT, thereby determining the signal quality Q. Certainly, the present invention is not limited thereto, and any other algorithm known in the prior art may also be used to detect the signal quality of a broadcast signal.

In addition to determining the signal quality Q of a currently received broadcast signal SAT, the controller 300 also evaluates historical broadcast signals broadcast via the satellite-to-earth link Ls in the past period of time. Thus, the controller 300 can, on the basis of signal quality and an evaluation result of historical broadcast signals (indicated by the symbol λ below), determine whether to switch to an auxiliary data link provided by the base station BST, so as to receive, through the base station BST, correction data Correction_Data provided by the remote server RSV. As mentioned earlier, the correction data Correction_Data broadcast by the geostationary satellite S is also synchronized to the satellite S by the remote server RSV.

Figure 4:
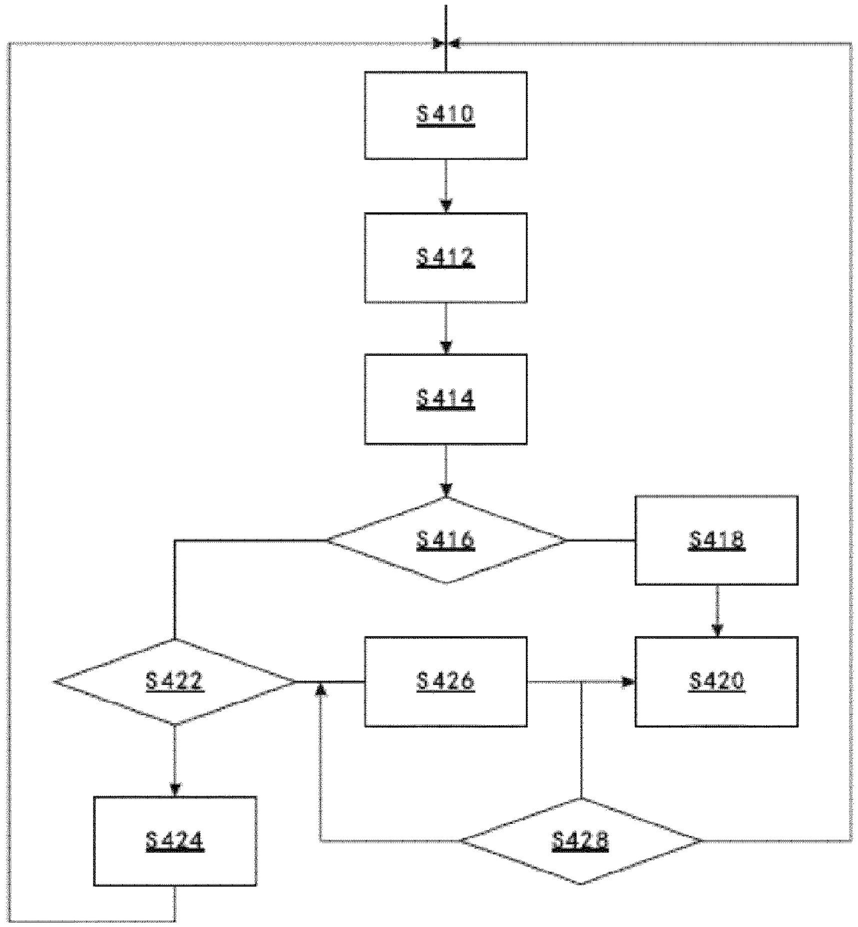
FIG. 4 shows a flowchart for a link switching method implemented in a positioning process according to an embodiment of the present invention.

FIG. 4 shows a specific embodiment of the flow of a link switching method implemented by the controller 300 during the positioning process. As shown in FIG. 4, in step 410, the controller 300 receives a current broadcast signal $SAT_0$ from the satellite-to-earth link Ls through the receiver 100, wherein the broadcast signal $SAT_0$ contains the coded correction data Correction_Data. It should be pointed out that since a satellite-to-earth link does not impose any limitations on the number of receiving devices and delivers good real-time performance, as a default, the controller 300 always uses the satellite-to-earth link Ls as the main link to receive the broadcast signal SAT. In step 412, the controller 300 decodes the broadcast signal $SAT_0$ to determine the signal quality of the current broadcast signal, wherein the signal quality may be determined by determining whether the restored correction data Correction_Data is decoded correctly or on the basis of a carrier-to-noise (C/N) ratio of the link.

In step 414, the controller 300 further evaluates the overall quality of historical broadcast signal streams broadcast via the satellite-to-earth link Ls within a predetermined period of time, representing an evaluation result with the symbol λ. For example, assume that the controller 300 has received broadcast signals N times from the satellite S via the satellite-to-earth link Ls in the time period T that has just elapsed. Each time a satellite signal is received and correctly decoded, a success indicator value, for example, 1, is assigned to the signal quality Q received this time, and for a satellite signal that cannot be decoded correctly, a failure indicator value, for example, 0, is assigned to the signal quality Q received this time. Therefore, the evaluation result λ of the reception of historical broadcast signals via the satellite-to-earth link Ls in the past time period T may be expressed by the following formula:

$$\lambda = \frac{\sum_{i=1}^{N} Q_i}{N} \tag{1}$$

This value λ represents the correct decoding rate of the broadcast signal SAT received within the predetermined time period T.

According to an example of the present invention, a memory, as indicated by reference numeral 400 in FIG. 3, is disposed in the control device, for storing the signal quality indicator values Q of the N times of decoding within time period T.

Thus, in step S414, when evaluating a historical broadcast signal, the controller 300 may obtain an evaluation result λ of the historical broadcast signal by reading the signal quality values ($Q_N$, $Q_{N-1}$, . . . $Q_1$) of the N times of decoding in the memory and performing calculation according to the preceding formula (1). It is understandable that with the continuous reception of the satellite broadcast signal SAT, the quality indicator values Q of the N times of decoding that are stored in the memory 400 are also continuously updated. As another example, the controller 300 can further directly calculate an evaluation result λ value on the basis of a quality indicator value Q of each decoding and store it in the memory, and thus the controller 300 can directly read the evaluation result λ when needed. However, this is done at the price of an increase in calculation cost; especially, when the quality of the satellite-to-earth link Ls is good, it is not necessary to perform such calculations all the time. After determining the signal quality $Q_0$ of the current decoded signal $SAT_0$ and determining the evaluation result of the historical broadcast signal, the controller 300 can determine whether the current satellite-to-earth link Ls remains available and, when it has become unavailable, switch to an auxiliary data link Lw to receive correction data Correction_Data.

Specifically, in step 416, the controller 300 determines whether the signal quality of the current broadcast signal $SAT_0$ has reached a predetermined standard, for example, determining whether the correction data Correction_Data may be successfully decoded from the broadcast signal $SAT_0$ and restored. If the signal quality has reached a predetermined standard, then the process proceeds to step S418, in which the controller 300 makes a decision to continue obtaining correction data via the satellite-to-earth link Ls. Then, in step 420, the controller 300 applies the correction data Correction_Data restored in step 412; the application comprises performing correction processing on satellite signals received from positioning satellites such as $P_1$, $P_2$, and $P_3$, for example, obtaining more accurate position parameters needed by positioning satellites $P_1$, $P_2$, and $P_3$ to provide positioning services, extracting a satellite clock difference, an orbit difference, parameters related to the atmospheric ionosphere and troposphere, and other parameters, so that the controller 300 can use these parameters to calculate the current geographical position coordinates, thereby achieving more accurate position estimation. In addition, in step 416, the controller 300 stores, in the memory 400, the success indicator value $Q_0=1$ of the current decoding, and deletes the oldest data $Q_N$ to form updated data ($Q_{N-1}$, $Q_{N-2}$, . . . $Q_1$, $Q_0$). Alternatively, in another example, the N−1 indicator values $Q_{n-1}$, $Q_{n-2}$, . . . $Q_1$ originally stored in the memory 400 and the current indicator value $Q_0$ are used to recalculate link quality λ and update the memory 400 on the basis of formula (1).

If in step 416, the controller 300 determines that the decoding has failed and that the signal quality has not reached the predetermined standard, for example, that positioning data Correction_Data has failed to be successfully restored from the current broadcast signal $SAT_0$, then the process proceeds to step S422. In step 422, it is determined whether the evaluation result λ determined in step 414 satisfies a predetermined condition; for example, it is determined whether λ is greater than or equal to a predetermined threshold $\lambda_{THR}$; the threshold $\lambda_{THR}$, for example, may be 90%, and may be specifically set according to actual needs. If λ is greater than or equal to the predetermined threshold $\lambda_{THR}$, then it indicates that the broadcast signal received via the satellite-to-earth link Ls is still reliable and stable for at least the past time period T, and that the current failure to decode may be due to an accidental factor; therefore, the process proceeds to step S424. In step 424, the controller 300 makes a decision to continue obtaining the correction data Correction_Data via the satellite-to-earth link Ls, and obtains the signal SAT broadcast by the satellite S at the next time point via the satellite-to-earth link Ls. Therefore, the process returns to step 410, in which the correction data broadcast by the satellite S at the next time point is received, and the above-described processing is repeated.

If it is determined in step 422 that the evaluation result of a historical broadcast signal received within a predetermined time period does not meet a predetermined condition, for example, if it is determined that λ is smaller than a predetermined threshold $\lambda_{THR}$, then it may be determined that the link quality of the satellite-to-earth link Ls may go down in the most recent time period T and, therefore, a decision is made to switch to an auxiliary link Lw to obtain the correction data Correction_Data. Therefore, the process proceeds to step 426, in which the controller 300 establishes a wireless communication link Lw to the base station BST through the network interface 200, and obtains the correction data Correction_Data from the remote server RSV through the base station BST. Then, in step 420, the controller 300 applies the correction data Correction_Data from the base station, for example, performing positioning-related processing. It should be noted that, according to the present invention, while receiving the correction data Correction_Data via the auxiliary link Lw, it is still necessary to regularly observe whether the link quality of the main data link, that is, the satellite-to-earth link Ls, has been improved and, if it has been improved, switch back to the main data link. Therefore, as shown in FIG. 4, the process further comprises step 428, in which, after the auxiliary link Lw to the base station BST is established, the controller 300 continues receiving the broadcast signal SAT from the satellite-to-earth link Ls through the receiver 100, for example, obtaining the current broadcast signal $SAT_j$ at the j-th time, and judging whether the signal quality of the signal $SAT_j$ meets a predetermined standard. For example, if the correction data Correction_Data still cannot be correctly decoded from the signal $SAT_j$, then the controller 300 continues receiving subsequent correction data Correction_Data from the base station BST via the wireless communication link Lw. However, once it is determined that the signal quality of $SAT_j$ meets a predetermined standard, then the controller 300 makes a decision to switch back to the satellite-to-earth link Ls, receives subsequent correction data Correction_Data via the satellite-to-earth link Ls, and continues to perform Steps 410 to 428. This makes it possible to avoid prolonged occupancy of the wireless communication link Lw, which may cause a waste of resources.

In another embodiment, in step 428, a decision on whether to switch back to the satellite-to-earth link may also be made on the basis of an evaluation of historical broadcast signals from the satellite-to-earth link Ls. Specifically, a quality indicator value $Q_j$, for example, 1 or 0, of the current decoding is assigned on the basis of the signal quality of the signal $SAT_j$; then, the latest N−1 pieces of historical data stored in the memory 400 are read, and an evaluation result λ of the historical broadcast signals in the past time period T is determined according to the formula (1). If an evaluation result λ determined at this time is greater than or equal to a predetermined threshold $\lambda_{THR}$, a switch is made back to the satellite-to-earth link Ls; otherwise, data reception continues on the wireless communication link Lw. It should be pointed out that a judgment result of the signal quality of each decoding performed in step 428, that is, a $Q_j$ value or quality λ updated on the basis of the $Q_j$ value, is updated to the memory 400 to maintain updated evaluation of the overall quality of historical broadcast signals.

A control device implemented according to the present invention may be configured in a vehicle, so that data required for positioning may be obtained in real time. In addition, a control device or a link switching method implemented according to the present invention may also be integrated into another terminal, for example, a positioning sensor, so as to realize control of switches between a plurality of links.

An exemplary embodiment of the present invention has been described above with reference to FIG. 4, and it is understandable that the steps of the method and the sequence of their performance are not mandatory, and may be adjusted or even deleted according to actual needs. For example, step S414 may be combined with step 422, so that historical broadcast signals are evaluated centrally in step 422.

In addition, although the preceding embodiments have been described in conjunction with a satellite positioning system, it becomes understandable, after reading this disclosure, that the present invention, instead of being limited to satellite communications, is equally applicable to another scenario in which a plurality of data links are available for receiving the same application data, wherein the main data link among the plurality of data links is used to receive a coded signal containing coded application data and, when the main data link becomes unavailable, a switch is made to the auxiliary data link among the plurality of data links to continue receiving the application data. After a switch has been made to the auxiliary data link, monitoring of the status of the main data link continues and, when the main data link becomes available, the auxiliary data link is disconnected and a switch is made back to the main data link to continue receiving application data.

While the present invention has been illustrated and explained in detail above in conjunction with the drawings and preferred embodiments, the present invention is not limited to these disclosed embodiments; those of ordinary skill in the art can make any modifications, including combinations, replacements, additions, and deletions of characteristics, on the basis of the preceding detailed disclosure, and all such solutions should all fall within the scope of protection defined by the appended claims.

What is claimed is:

1. A control method for link switching between a terrestrial base station and a correction satellite for receiving correction data, the control method comprising:

receiving satellite signals from positioning satellites;

receiving a current coded signal from the correction satellite according to a main data link, the current coded signal containing correction data;

determining if a signal quality of current coded signal has reached a predetermined standard, including determining that the signal quality has reached the predetermined standard when the current coded signal is decoded to determine the correction data, and determining that the signal quality has not reached the predetermined standard when the current coded signal cannot be decoded to determine the correction data;

in response to determining that the signal quality has reached the predetermined standard (i) correcting the satellite signals from the positioning satellites using the correction data from the correction satellite according to the main data link, and (ii) updating an evaluation result to indicate that the current coded signal is reliable; and in response to determining that the signal quality has not reached the predetermined standard (i) updating the evaluation result to indicate that the current coded signal is unreliable, and (ii) determining if the evaluation result satisfies a predetermined condition, when the evaluation result satisfies the predetermined condition (i) maintaining the main data link, and (ii) receiving a subsequent coded signal from the correction satellite to be processed to determine the signal quality, and when the evaluation result does not satisfy the predetermined condition (i) establishing an auxiliary data link to the terrestrial base station for receiving the correction data, and (ii) correcting the satellite signals from the positioning satellites using the correction data received from the terrestrial base station, wherein the correction data indicates a satellite clock difference, a satellite orbit difference, and/or parameters related to the ionosphere and the troposphere.

2. The control method as claimed in claim 1, wherein establishing the auxiliary data link when the evaluation result does not satisfy the predetermined condition comprises:

maintaining the main data link and obtaining the subsequent coded signal; and determining a signal quality of the subsequent coded signal and updating the evaluation result to form an updated evaluation result;

dropping the auxiliary data link when the updated evaluation result satisfies the predetermined condition; and maintaining the auxiliary data link when the updated evaluation result does not satisfy the predetermined condition.

3. The control method as claimed in claim 1, wherein:

the current coded signal is included in a plurality of historical coded signals received during a predetermined time, each coded signal of the plurality of historical coded signals having a corresponding signal quality, and the evaluation result is determined by (i) assigning a success indicator value to each coded signal of the plurality of historical coded signals for which the signal quality has reached the predetermined standard, (ii) assigning a failure indicator value to each coded signal of the plurality of historical coded signals for which the signal quality has not reach the predetermined standard, and (iii) combining the success indicator values and the failure indicator values, and the evaluation result corresponds to a correct decoding rate of the plurality of historical coded signals within the predetermined time.

4. The control method as claimed in claim 1, wherein:

the auxiliary data link is a wireless communication link for communicating with the terrestrial base station, and the terrestrial base station and the correction satellite are configured to communicate with a remote server to obtain the correction data.

5. The control method as claimed in claim 1, wherein a controller is configured to implement the control method.

6. The control method as claimed in claim 1, wherein:

updating the evaluation result to indicate that the current coded signal is reliable includes assigning a "1" value to the signal quality of the current coded signal, updating the evaluation result to indicate that the current coded signal is unreliable includes assigning a "0" value to the signal quality of the current coded signal, and the evaluation result is determined based on a summation of the assigned values for a plurality of historical coded signals in which the current coded signal is included.

7. The control method as claimed in claim 6 wherein the evaluation result is the summation divided by a number of coded signals included in the plurality of historical coded signals over a predetermined time period, such that the evaluation result corresponds to a correct decoding rate for the predetermined time period.

* * * * *